(12) United States Patent
Dellal et al.

(10) Patent No.: US 11,137,060 B2
(45) Date of Patent: Oct. 5, 2021

(54) ELECTRIC DRIVE UNIT COOLING AND LUBRICATION SYSTEM WITH BEARING SHIMS AND ROTOR SHAFT CHANNEL

(71) Applicant: Tesla, Inc., Palo Alto, CA (US)

(72) Inventors: Benjamin Dellal, San Francisco, CA (US); Luke Ottaway, Los Altos, CA (US); Scott Michael Graves, Felton, CA (US); Eric Bellemare, Mountain View, CA (US)

(73) Assignee: Tesla, Inc., Palo Alto, CA (US)

( * ) Notice: Subject to any disclaimer, the term of this patent is extended or adjusted under 35 U.S.C. 154(b) by 519 days.

(21) Appl. No.: 15/944,889

(22) Filed: Apr. 4, 2018

(65) Prior Publication Data

US 2019/0003572 A1 Jan. 3, 2019

Related U.S. Application Data

(60) Provisional application No. 62/527,921, filed on Jun. 30, 2017.

(51) Int. Cl.
*F16H 57/00* (2012.01)
*F16H 57/04* (2010.01)
(Continued)

(52) U.S. Cl.
CPC ........... *F16H 57/0409* (2013.01); *B60K 1/00* (2013.01); *B60K 17/043* (2013.01);
(Continued)

(58) Field of Classification Search
CPC ............. F16H 57/0402; F16H 57/0412; F16H 57/0423; F16H 57/0424; F16H 57/0427;
(Continued)

(56) References Cited

U.S. PATENT DOCUMENTS 4,269,295 A 5/1981 Kish
4,607,180 A * 8/1986 Stoody ................ F16H 25/2018
310/112

(Continued)

FOREIGN PATENT DOCUMENTS

CN 203831276 9/2014
GB 162552 5/1921

(Continued)

*Primary Examiner* — Maged M Almawri
(74) *Attorney, Agent, or Firm* — Knobbe, Martens, Olson & Bear, LLP

(57) ABSTRACT

Systems and method for cooling and lubricating power transmission systems include providing oil to an oil tube and then to a rotor shaft via the oil tube. Oil may also be provided through at least one channel defined in an end of the oil tube inserted into an annular region of the rotor shaft, through at least one channel defined in an end of the gear shaft and between the end and a shoulder of the rotor shaft and through at least one channel defined in side surface of the rotor shaft in a region of rotor shaft inserted into the gear shaft. Such systems and method can also include providing oil a fluid passageway in a bearing shim plate via an inlet tube. Oil may also be provided through a radial gap adjacent a bearing shim plate outlet and chamber defined in the bearing shim plate.

20 Claims, 15 Drawing Sheets

(51) Int. Cl.

| | | |
|---|---|---|
| *H02K 7/116* | (2006.01) | |
| *B60K 1/00* | (2006.01) | |
| *B60K 17/04* | (2006.01) | |
| *H02K 5/20* | (2006.01) | |
| *F16C 25/08* | (2006.01) | |
| *H02K 7/00* | (2006.01) | |
| *H02K 7/04* | (2006.01) | |
| *H02K 7/08* | (2006.01) | |
| *H02K 15/16* | (2006.01) | |
| *H02K 1/20* | (2006.01) | |
| *H02K 9/193* | (2006.01) | |
| *F16H 57/032* | (2012.01) | |
| *F16H 57/02* | (2012.01) | |
| *F16H 57/037* | (2012.01) | |
| *H02K 9/19* | (2006.01) | |
| *B60K 1/02* | (2006.01) | |

(52) U.S. Cl.
CPC ....... *F16C 25/083* (2013.01); *F16H 57/0402* (2013.01); *F16H 57/046* (2013.01); *F16H 57/0412* (2013.01); *F16H 57/0423* (2013.01); *F16H 57/0424* (2013.01); *F16H 57/0427* (2013.01); *F16H 57/0436* (2013.01); *F16H 57/0457* (2013.01); *F16H 57/0471* (2013.01); *F16H 57/0482* (2013.01); *F16H 57/0483* (2013.01); *H02K 1/20* (2013.01); *H02K 5/20* (2013.01); *H02K 7/003* (2013.01); *H02K 7/04* (2013.01); *H02K 7/083* (2013.01); *H02K 7/116* (2013.01); *H02K 9/193* (2013.01); *H02K 15/165* (2013.01); *B60K 1/02* (2013.01); *B60K 17/04* (2013.01); *B60K 2001/001* (2013.01); *B60Y 2200/91* (2013.01); *B60Y 2306/03* (2013.01); *B60Y 2306/05* (2013.01); *B60Y 2410/1022* (2013.01); *F16C 2326/06* (2013.01); *F16H 57/037* (2013.01); *F16H 2057/02034* (2013.01); *F16H 2057/0325* (2013.01); *H02K 7/006* (2013.01); *H02K 9/19* (2013.01)

(58) Field of Classification Search
CPC ............. F16H 57/0436; F16H 57/0457; F16H 57/046; F16H 57/0471; F16H 57/0482; F16H 57/0483; F16H 57/037; F16H 2057/02034; B60K 1/00; B60K 17/043; B60K 17/04; B60K 2001/0014; F16C 25/083; F16C 2326/06; H02K 1/20; H02K 7/003; H02K 7/04; H02K 7/083; H02K 7/116; H02K 7/007; H02K 7/006; H02K 9/193; H02K 9/19; H02K 15/165; B60Y 2200/91; B60Y 2306/03; B60Y 2410/1022
USPC .................................. 310/75 D, 83, 106–216
See application file for complete search history.

(56) References Cited

U.S. PATENT DOCUMENTS

| | | | |
|---|---|---|---|
| 5,251,725 A | 10/1993 | Barrett, Jr. | |
| 5,899,574 A | 5/1999 | Chujo | |
| 6,123,338 A | 9/2000 | Edelmann | |
| 6,158,898 A | 12/2000 | Jeng | |
| 6,507,134 B1 | 1/2003 | Severien | |
| 6,938,731 B2 | 9/2005 | Slesinski | |
| 7,374,507 B2 | 5/2008 | Corless | |
| 9,052,009 B2 | 6/2015 | Barillot | |
| 9,810,311 B1 | 11/2017 | Zhang | |
| 9,822,869 B1* | 11/2017 | Carr | F16H 57/0427 |
| 10,208,848 B2 | 2/2019 | Hotait | |
| 10,510,195 B2 | 12/2019 | Patil et al. | |
| 10,781,909 B2 | 9/2020 | Graves et al. | |
| 10,801,606 B2 | 10/2020 | Dellal | |
| 2004/0130224 A1* | 7/2004 | Mogi | H02K 5/1732 310/75 R |
| 2004/0134693 A1* | 7/2004 | Yamagishi | H02K 9/19 180/65.1 |
| 2005/0045393 A1* | 3/2005 | Mizutani | B60K 17/046 180/65.51 |
| 2006/0062505 A1 | 3/2006 | Hoefs | |
| 2009/0102298 A1* | 4/2009 | Savant | H02K 9/19 310/52 |
| 2009/0127954 A1* | 5/2009 | Mogi | B60K 17/12 310/90 |
| 2009/0212649 A1 | 8/2009 | Kingman | |
| 2010/0187954 A1* | 7/2010 | Kendall | B60K 17/046 310/67 R |
| 2012/0096968 A1 | 4/2012 | Kawamoto | |
| 2013/0293040 A1 | 11/2013 | Chamberlin | |
| 2014/0027238 A1 | 1/2014 | Schlaufman | |
| 2014/0056733 A1* | 2/2014 | Ojima | F04B 17/00 417/321 |
| 2014/0147306 A1* | 5/2014 | Yamashita | F01D 5/027 417/410.1 |
| 2014/0284183 A1* | 9/2014 | Wolters | B65G 23/08 198/788 |
| 2014/0364263 A1* | 12/2014 | Tokunaga | F16C 19/04 475/149 |
| 2015/0082929 A1* | 3/2015 | Isomura | F16D 1/10 74/331 |
| 2016/0311306 A1* | 10/2016 | Sugiyama | F16H 1/28 |
| 2017/0096058 A1* | 4/2017 | Kanada | F16H 57/02 |
| 2018/0259060 A1 | 9/2018 | Poster | |
| 2018/0278126 A1* | 9/2018 | Goldstein | H02K 9/19 |
| 2019/0003526 A1 | 1/2019 | Graves | |
| 2019/0006914 A1 | 1/2019 | Graves | |
| 2019/0267869 A1* | 8/2019 | Soma | B60K 6/442 |
| 2021/0018087 A1 | 1/2021 | Dellal | |

FOREIGN PATENT DOCUMENTS

| | | |
|---|---|---|
| GB | 1426352 | 2/1976 |
| WO | WO 16/04670 | 12/2016 |

* cited by examiner

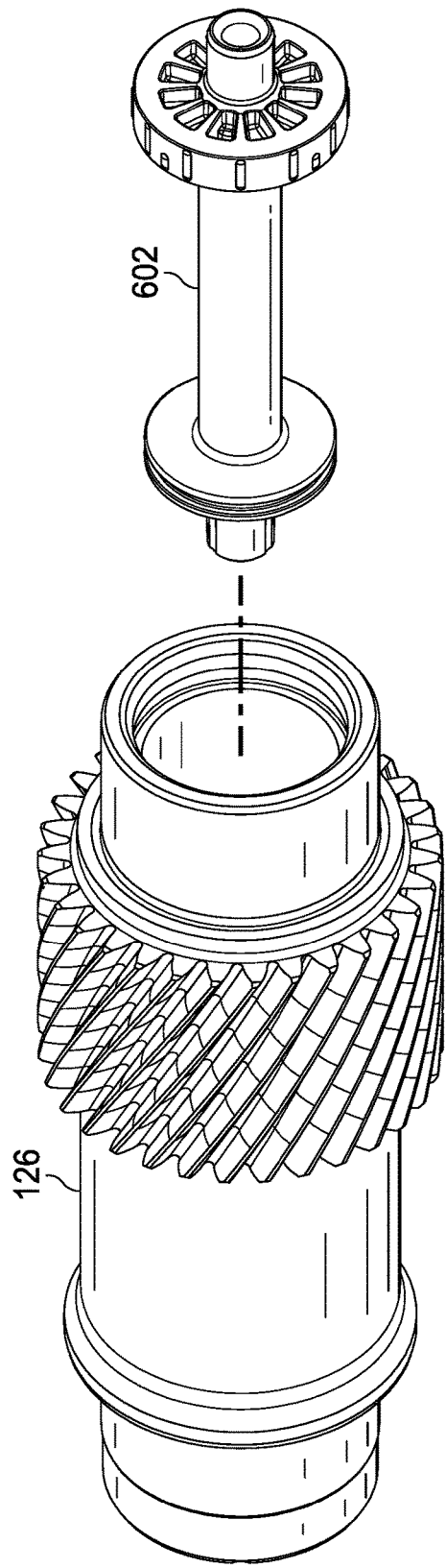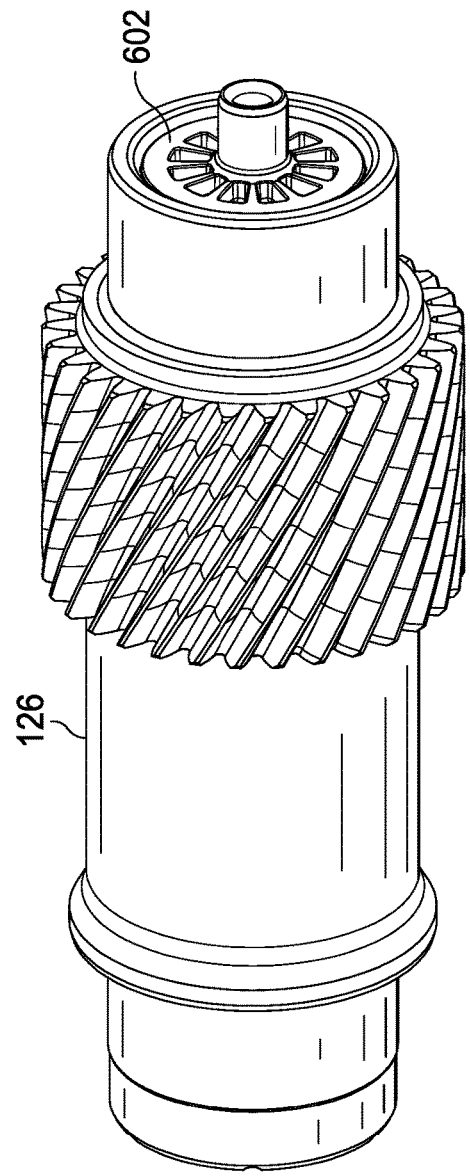
FIG. 7A
FIG. 7B

ELECTRIC DRIVE UNIT COOLING AND LUBRICATION SYSTEM WITH BEARING SHIMS AND ROTOR SHAFT CHANNEL

CROSS-REFERENCE TO RELATED APPLICATION

The present U.S. Utility patent application claims priority pursuant to 35 U.S.C. § 119(e) to U.S. Provisional Application No. 62/527,921, entitled "ELECTRIC DRIVE UNIT", filed Jun. 30, 2017, which is hereby incorporated herein by reference in its entirety and made part of the present U.S. Utility patent application for all purposes.

The present application is related to U.S. Utility patent application Ser. No. 15/637,313, entitled "SYSTEM AND METHOD FOR MONITORING STRESS CYCLES," filed Jun. 29, 2017, which is incorporated by reference in its entirety.

BACKGROUND

Technical Field

The present invention relates to cooling and lubricating power transmission devices, and more particularly to cooling and lubricating power transmission devices having multiple shafts and bearings.

Description of Related Art

In the art of electric drive units and, more generally, power transmission devices, the cooling and lubrication of components therein is an important consideration. For example, if, on the one hand, heat is not adequately dissipated, and parts not adequately lubricated, the efficiency, performance and life span of the system can be compromised. With respect to a loss in efficiency, this translates to loss of vehicle range when such electric drive units or power transmission devices are used in a vehicle, or an increase in system weight and system cost, for example, if one were to increase the number of batteries in an electric vehicle to achieve a desired range. If, on the other hand, too much cooling and lubrication fluid is used, unnecessary drag on moving components can result, which can also impact performance and lead to a loss in efficiency. Consideration must also be given to the design of cooling and lubrication parts for manufacturing and assembly purposes, bearing in mind variations in the arrangement of cooperating components from one system to the next.

A need exists, therefore, for improved apparatuses and approaches for cooling and lubricating electric drive units and other power transmission devices.

SUMMARY

Thus, in order to overcome the shortcomings of the prior art among other shortcomings, a first embodiment of the present disclosure is directed to an electric drive unit having a rotor shaft, a gear shaft, and an oil tube. The rotor shaft has a first end, a second end, a first region extending from the first end to a first shoulder, and a rotor shaft inlet within the first end. The gear shaft has a third end, a fourth end, wherein the first region of the rotor shaft resides within the fourth end of the gear shaft, and the fourth end is adjacent the first shoulder. The oil tube resides within the gear shaft and has an oil tube inlet at a fifth end, an oil tube outlet at a sixth end adjacent the rotor shaft inlet, and an oil tube passageway extending between the oil tube inlet and the oil tube outlet. This structure provides improved lubrication and cooling benefits as compared to prior structures.

According to a first aspect of the first embodiment, the electric drive unit further includes a bearing shim plate having a bearing shim plate outlet defined therein, wherein the oil tube inlet is adjacent to the bearing shim plate outlet with a gap existing therebetween. With this aspect, the oil tube inlet may be machined.

According to a second aspect of the first embodiment, an annular region is defined in the first region extending from the first end to the rotor shaft inlet. With such second aspect, an inserted portion of the oil tube may be positioned within the annular region, and the oil tube outlet is adjacent to the rotor shaft inlet. Further, according to this second aspect, the sixth end may have at least one channel defined therein.

According to a third aspect of the first embodiment, the third end has at least one channel defined therein. According to a fourth aspect of the first embodiment, at least one channel may be defined in a first side surface of the rotor shaft within the first region. With this fourth aspect, the at least one channel may be defined in a pilot journal of the rotor shaft.

According to a fifth aspect of the first embodiment, the rotor shaft may define a first spline connector within the first region, wherein the gear shaft defines a second spline connector, and wherein the first spline connector and second spline connector form a spline connection. These first through fifth aspects of the first embodiment may be included singularly or in any various combination to include two or more of these aspects.

According to a second embodiment of the present disclosure, an electric drive unit includes a rotor shaft, a gear shaft, a first tube, a second tube, a first bearing, a second bearing and a bearing shim plate. The rotor shaft has a first end, a second end, and a rotor shaft inlet defined in the first end of the rotor shaft. The gear shaft has a third end and a fourth end. The first tube has a fifth end and a sixth end and defining a first fluid passageway from a first tube inlet defined in the fifth end to a first tube outlet defined in the sixth end. The second tube defines a second fluid passageway from a second tube inlet to a second tube outlet. The bearing shim plate has a body, the body defining an outer side and an inner side, the body further defining a fourth fluid passageway extending from a bearing shim plate inlet defined in the inner side of the body to a first bearing shim plate outlet defined in the inner side of the body, the body further defining a cavity extending into the body from the inner side of the body toward the outer side of the body. The cavity of the bearing shim plate defines a first chamber having the first bearing shim plate outlet situated therein, a second chamber, a third fluid passageway extending between the first chamber and second chamber, and a second bearing shim plate outlet in fluid communication with the second chamber. The first tube is situated within the gear shaft with the first tube outlet adjacent the rotor shaft inlet. The second tube outlet is connected to and in fluid communication with the bearing shim plate inlet. The first tube inlet is adjacent to and in fluid communication with the first bearing shim plate outlet with a gap existing therebetween. The first chamber is adjacent the first bearing and the second chamber is adjacent the second bearing. This structure provides improved lubrication and cooling benefits as compared to prior structures.

According to a first aspect of the second embodiment, the body further defines a fifth fluid passageway extending between the first chamber and the second chamber. With this first aspect of the second embodiment, the body further defines a third bearing shim plate outlet in fluid communication with the first chamber. The previously described aspects of the first embodiment may also be applied to the second embodiment, singularly or in combination with each other and/or the first aspect of the second embodiment.

According to a third embodiment of the present disclosure, a method for use in an electric drive unit, the electric drive unit including a rotor shaft, a gear shaft, and a first tube, wherein the rotor shaft defines a first end and a second end, wherein the rotor shaft defines a first region from the first end to a first shoulder, wherein the rotor shaft defines a rotor shaft inlet in the first end of the rotor shaft, wherein the gear shaft defines a third end and a fourth end, wherein the first region of the rotor shaft is inserted into the fourth end of the gear shaft, wherein the fourth end of the gear shaft is adjacent to the first shoulder, wherein the first tube defines a fifth end and a sixth end and further defines a fluid passageway from first tube inlet at the fifth end to an first tube outlet at the sixth end, and wherein the first tube is situated within the gear shaft with the first tube outlet adjacent the rotor shaft inlet is disclosed. The method of the third embodiment includes providing oil into the first tube via the first tube inlet and providing the oil to the rotor shaft inlet via the first tube outlet. This method provides improved lubrication and cooling benefits as compared to prior structures.

According to a first aspect of the third embodiment, an annular region is defined in the first region extending from the first end to the rotor shaft inlet, wherein an inserted portion of the first tube is positioned within the annular region, wherein the first tube outlet is adjacent to the rotor shaft inlet, and wherein the sixth end has at least one channel defined therein, and the method further includes providing the oil through the at least one channel and between the inserted portion of the first tube and the annular region.

According to a second aspect of the third embodiment, the third end has at least one channel defined therein, and the method further includes providing the oil through the at least one channel and between the third end and the first shoulder.

According to a third aspect of the third embodiment, at least one channel is defined in a first side surface of the rotor shaft within the first region, and the method further includes providing the oil through the at least one channel and between the first region of the rotor shaft and the gear shaft.

According to a fourth aspect of the third embodiment, the rotor shaft defines a first spline connector within the first region, wherein the gear shaft defines a second spline connector, and the first spline connector and the second spline connector form a spline connection, and the method further includes providing oil through the spline connection.

According to a fifth aspect of the third embodiment, the electric drive unit further includes a first bearing, a second bearing, a bearing shim plate, and a second tube, wherein the second tube defines a second fluid passageway from a second tube inlet defined to a second tube outlet, wherein the bearing shim plate defines a body having an outer side and an inner side, wherein the body defines a cavity extending into the body from the inner side of the body toward the outer side of the body, the cavity further defining, a first chamber, a second chamber, and a third fluid passageway extending between the first chamber and second chamber, wherein the body further defines a fourth fluid passageway extending from a first bearing shim plate inlet defined in the inner side of the body to a first bearing shim plate outlet defined in the inner side of the body and within the first chamber, wherein the body further defines a second bearing shim plate outlet in fluid communication with the second chamber, wherein the second tube outlet is connected to and in fluid communication with the first bearing shim plate inlet, wherein the first tube inlet is adjacent to and in fluid communication with the first bearing shim plate outlet with a gap existing therebetween, wherein the first bearing shim plate outlet is in fluid communication with the second chamber, wherein the first chamber is adjacent the first bearing, and wherein the second chamber is adjacent the second bearing and the method further includes providing the oil to the second tube via the second tube inlet, providing the oil to the fourth fluid passageway via the second tube outlet and the bearing shim plate inlet, providing the oil the through the gap and to the first chamber, and providing the oil through the third fluid passageway from the first chamber to the second chamber.

With the fifth aspect of the third embodiment, the body may further define a third bearing shim plate outlet in fluid communication with the first chamber and the method may further include providing the oil through the bearing shim plate outlet. The previously described aspects of the first and embodiments may also be applied to the third embodiment, singularly or in combination with each other.

BRIEF DESCRIPTION OF THE SEVERAL VIEWS OF THE DRAWINGS

FIGS. 7A and 7B show perspective views of a gear shaft and an oil tube in an unassembled form and an assembled form, respectively, according to disclosed embodiments.

DETAILED DESCRIPTION OF THE DISCLOSURE

Figure 1A:
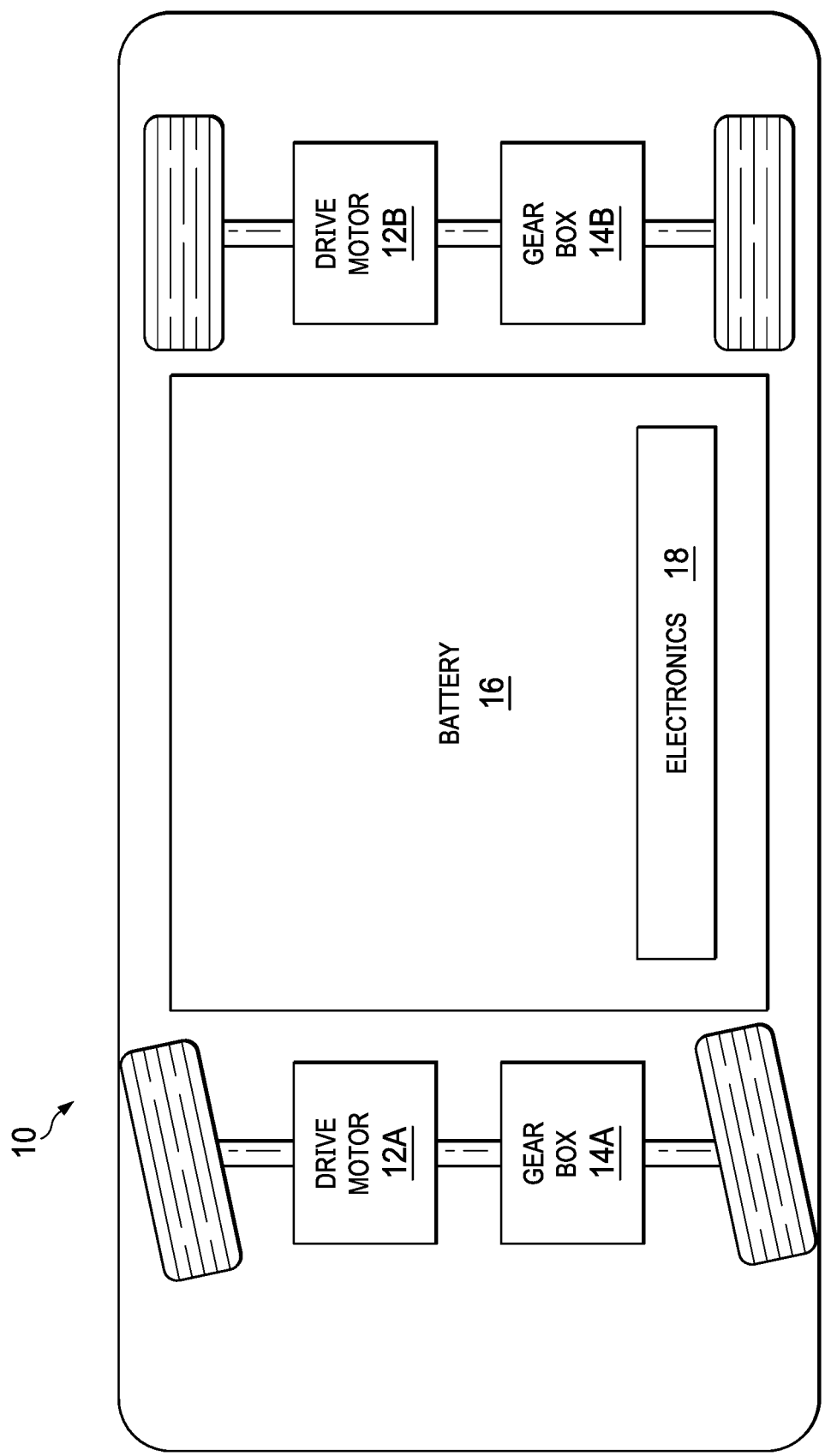
FIG. 1A illustrates the basic components of a battery powered electric vehicle.

FIG. 1A illustrates the basic components of a battery powered electric vehicle (electric vehicle) 10. The electric vehicle 10 includes at least one drive motor (traction motor)

12A and/or 12B, at least one gear box 14A and/or 14B coupled to a corresponding drive motor 12A and/or 12B, a battery 16 and electronics 18 (including drive motor electronics). Generally, the battery 16 provides electricity to the electronics 18 of the electric vehicle 10 and to propel the electric vehicle 10 using the drive motor 12A and/or 12B. The electric vehicle 10 includes a large number of other components that are not described herein but known to one or ordinary skill. While the construct of the electric vehicle 10 of FIG. 1A is shown to have four wheels, differing electric vehicles may have fewer or more than four wheels. Further, differing types of electric vehicles 10 may incorporate the inventive concepts described herein, including motor cycles, aircraft, trucks, boats, train engines, among other types of vehicles.

Various operational issues with the electric vehicle 10 are described herein in conjunction with various embodiments. One of these operational issues relates to the lubricating and cooling of the drive motor 12A and/or 12B and the gear box 14A and/or 14B and components thereof. Subsequent description herein may relate back to the components of this FIG. 1A. Common numbering may be used to refer to components identified in further FIGs. described herein.

Figure 1B:
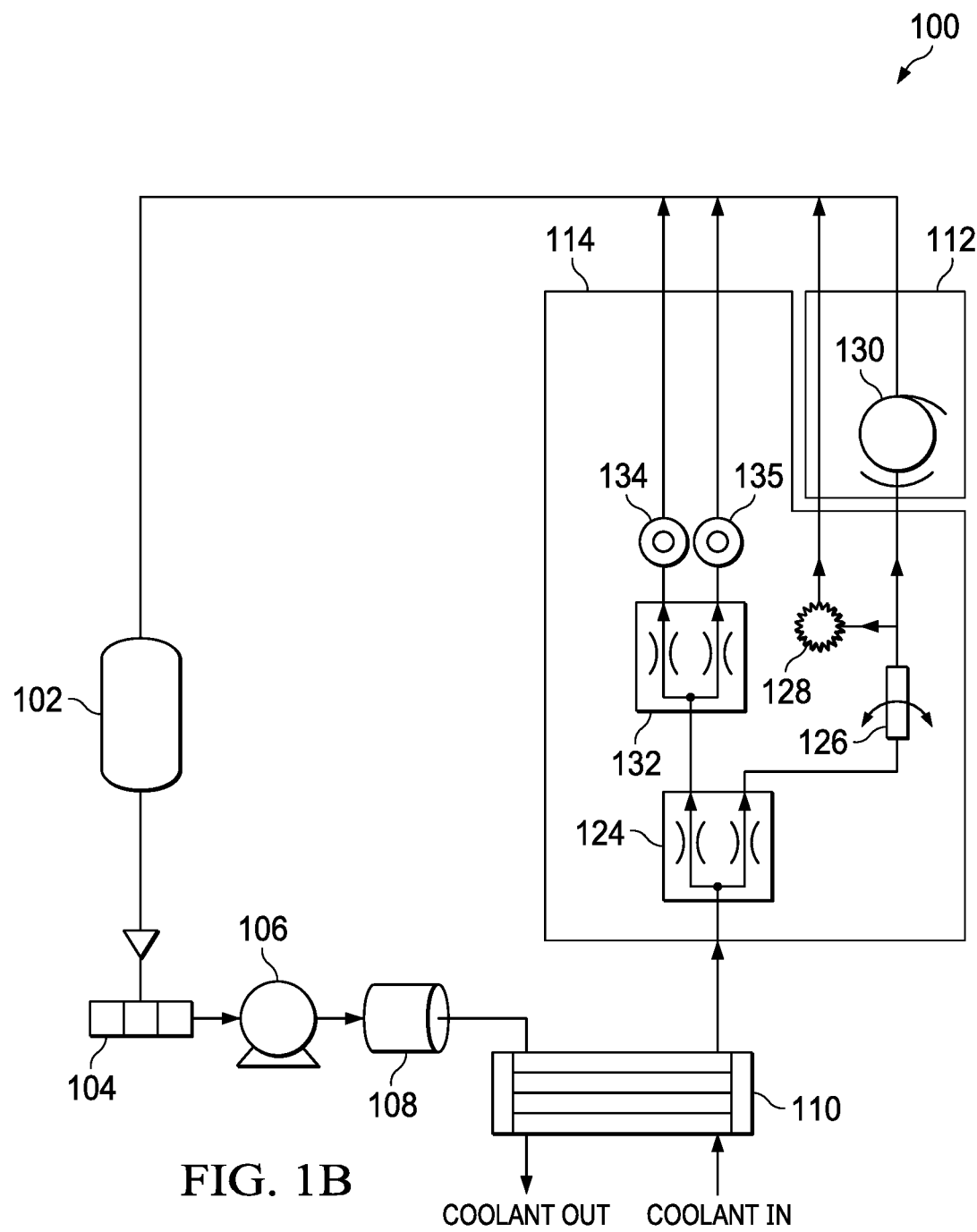
FIG. 1B illustrates a schematic diagram of an oil distribution system according to a disclosed embodiment.

FIG. 1B illustrates a schematic diagram of a cooling and lubrication system 100 according to a disclosed embodiment, which system is used to circulate a fluid, for example oil, though various components of an electric drive unit used in an electric passenger vehicle, for example. Though the embodiments described herein are in the context of a petroleum oil-based system, other fluids could be used. For example, any fluid which provides adequate lubrication, heat transfer and flow properties, for a particular application or pump size, could be used. Starting from oil reservoir 102, which could include a sump or dry sump system (e.g. an oil reservoir external to the drive unit), oil flows through meshed filter 104 to electric pump system 106. Oil pumped out of electric pump system 106 then passes through oil filter 108 and into heat exchanger 110. From heat exchanger 110, oil then flows to gear box 114 and ultimately drains back to oil reservoir 102. Though oil coming out of heat exchanger is shown as flowing to gear box 114 only, the oil could also flow to other places as well, such as directly to motor 112. For purposes of this description, however, only that part of the oil flowing to gear box 114 is described. Motor 112 could be drive motor 12A or 12B of FIG. 1A. Gear box 114 could be gear box 14A or 14B or FIG. 1A.

With respect to oil flowing to gear box 114, the oil first passes through bearing cover plate 124, which splits the oil such that part flows to gear shaft 126. Of the oil flowing to gear shaft 126, some passes through spline connection 128, while some goes to rotor 130 of motor 112, with both ultimately draining back to oil reservoir 102. Regarding the other oil flow path through bearing cover plate 124, that part of the oil flows through oil flow paths 132 within bearing cover plate 124, onto bearings 134 and 135 and ultimately back to oil reservoir 102. Bearings 134 and 135 may also referred to as the first bearing and second bearing, respectively, herein. Structure associated with this schematic diagram, and a more detailed explanation of the flow of oil therethrough, is presented below in conjunction with FIGS. 2-10.

Figure 2:
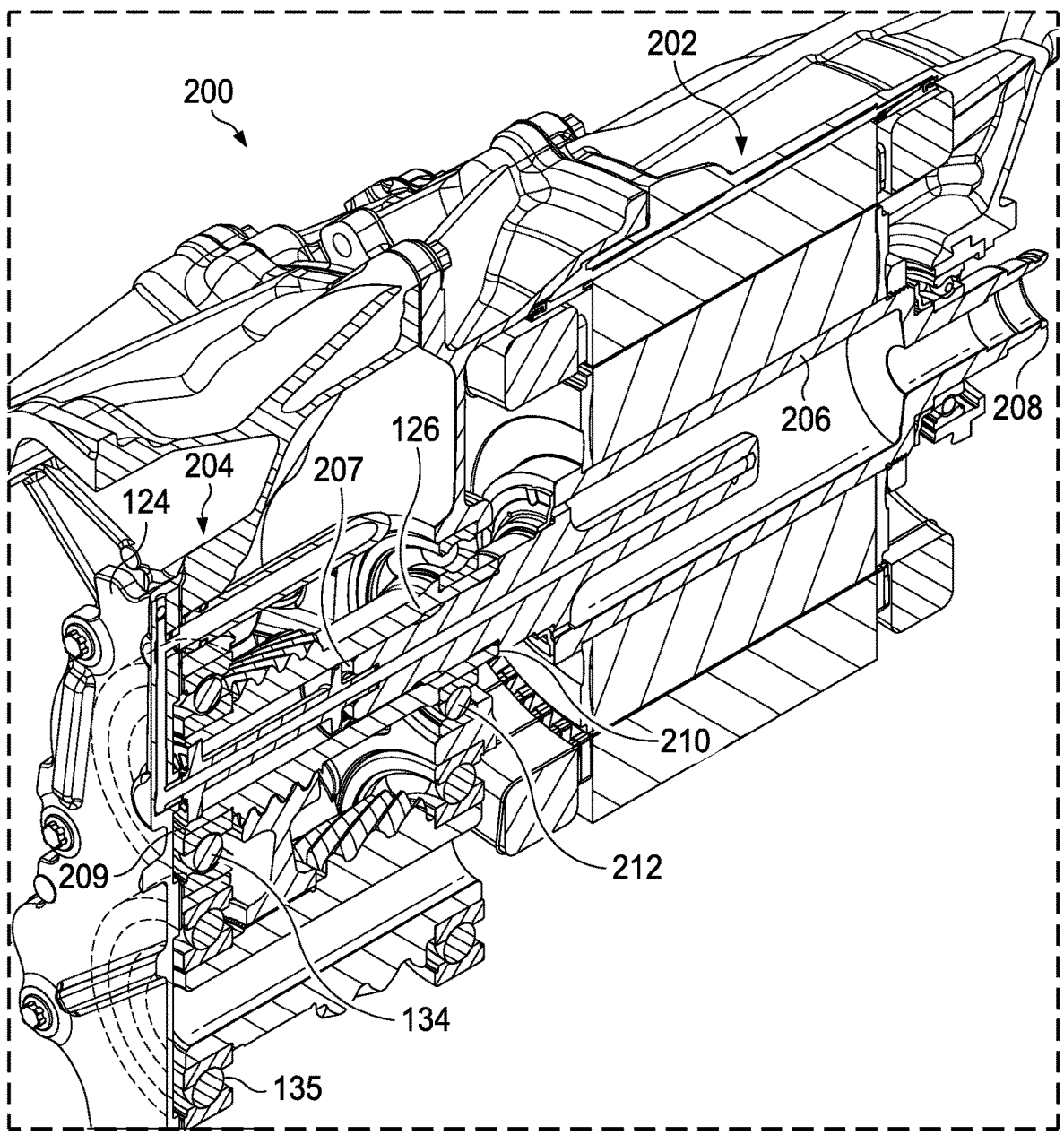
FIG. 2 illustrates a perspective side sectional view of drive unit according to a disclosed embodiment.

FIG. 2 illustrates a perspective side sectional view of drive unit 200 according to a disclosed embodiment. As shown therein, drive unit 200 includes motor section 202 and gear box section 204. Also shown therein is rotor shaft 206 having end 207 and end 208, gear shaft 126 having end 209 and 210, bearing shim plate 124, and bearings 134, 135, and 212.

Figure 3A:
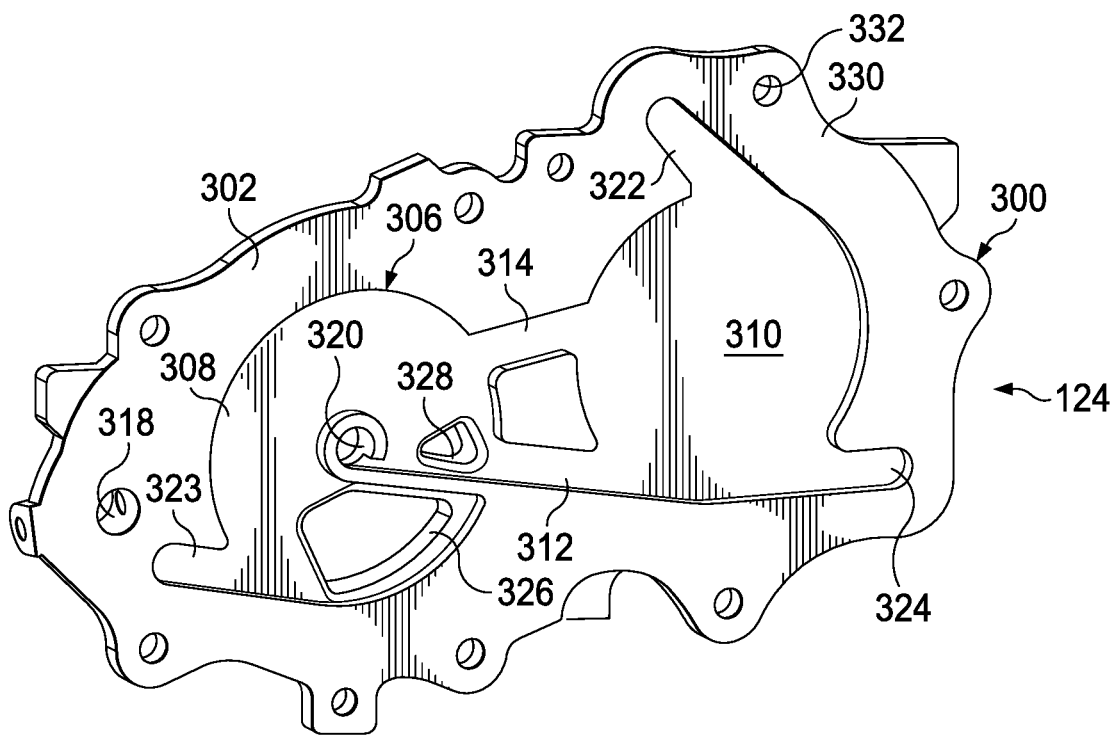
FIGS. 3A and 3B illustrate inner side and outer side perspective views, respectively, of a bearing shim plate according to a disclosed embodiment.
Figure 3B:
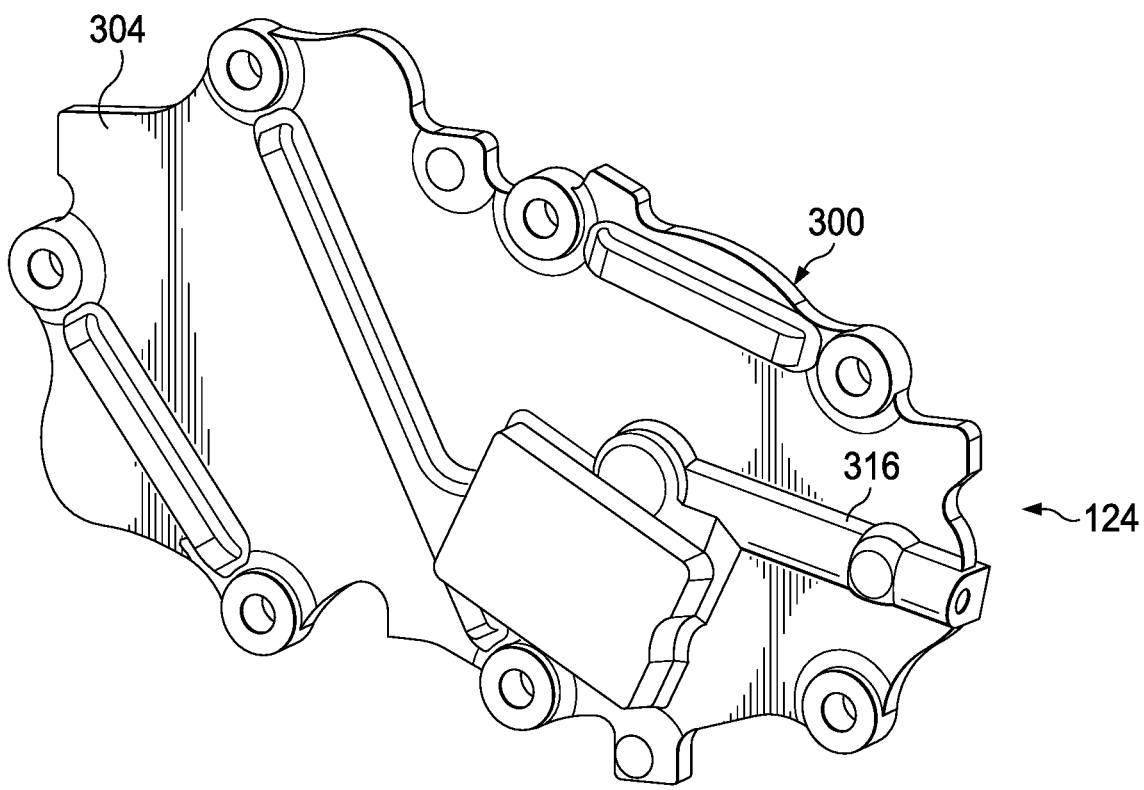

FIGS. 3A and 3B illustrate inner side and outer side perspective views respectively of a bearing shim plate according to a disclosed embodiment. As shown therein bearing shim plate 124 includes body 300 which defines inner side 302, outer side 304, and cavity 306 extending into body 300 from inner side 302 which cavity further defines first chamber 308, second chamber 310 and fluid passageways 312 and 314 extending between first chamber 308 and second chamber 310. Also defined by body 300 is fluid passageway 316 extending between bearing shim plate inlet 318 and first bearing shim plate outlet 320, which first bearing shim plate outlet 320 is situated within first chamber 308. Also defined by body 300 are second bearing shim plate outlets 322 and 324 adjacent to, and in fluid communication with second chamber 310, and third bearing shim plate outlet 323 in fluid communication with first chamber 308, which bearing shim plate outlets mate with one or more inlets (not shown) on the electric drive unit case to which bearing shim plate is attached. Also defined by body 300 in first chamber 308 are recessed areas 326 and 328. Inner side 302 also defines a mating flange 330 having attachment holes 332 defined therein. As will be appreciated by one of skill in the art, bearing shim plate 124 does not require both of fluid passageways 312 and 314, nor all of bearing shim plate outlets 322, 323 and 324. As explained below, however, this design allows for a single part to be used in multiple orientations thereby simplifying the manufacturing and assembly processes.

Figure 4A:
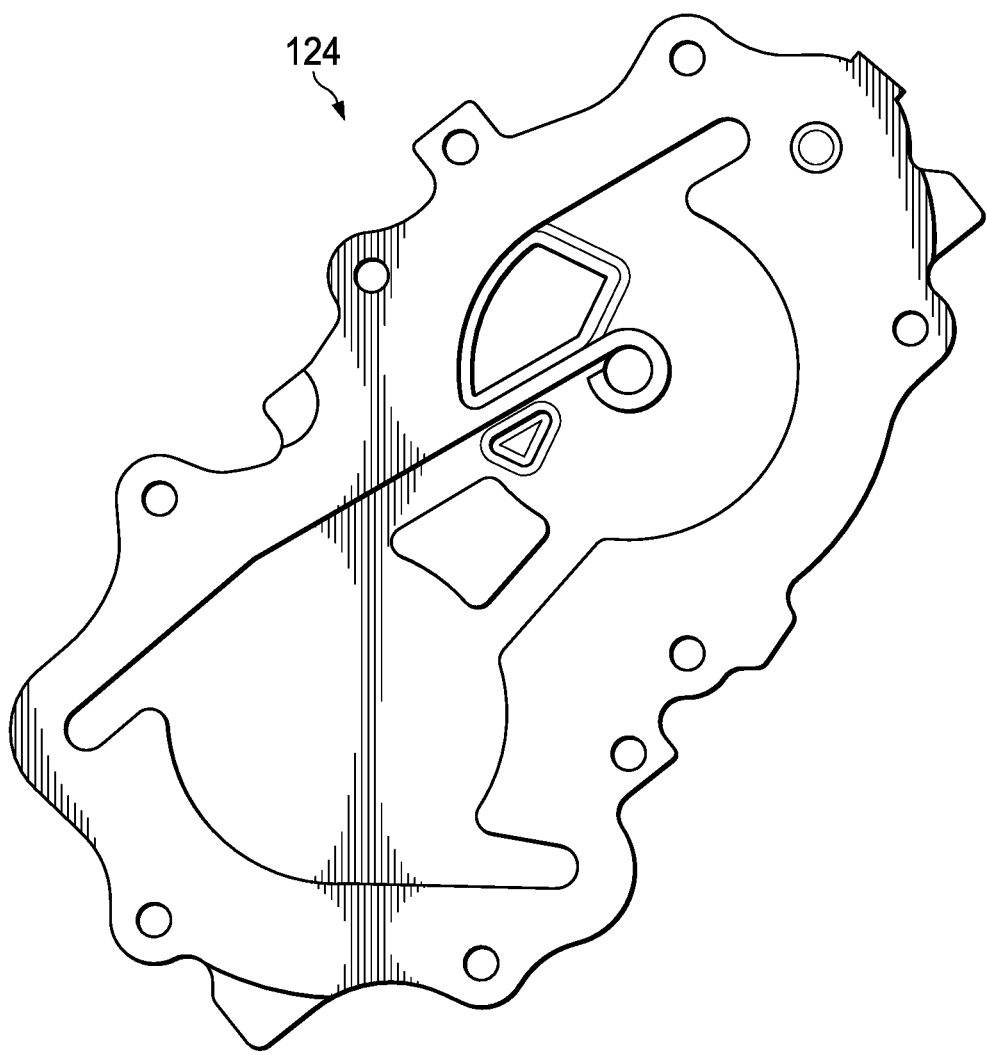
FIGS. 4A and 4B illustrate inner side views.
Figure 4B:
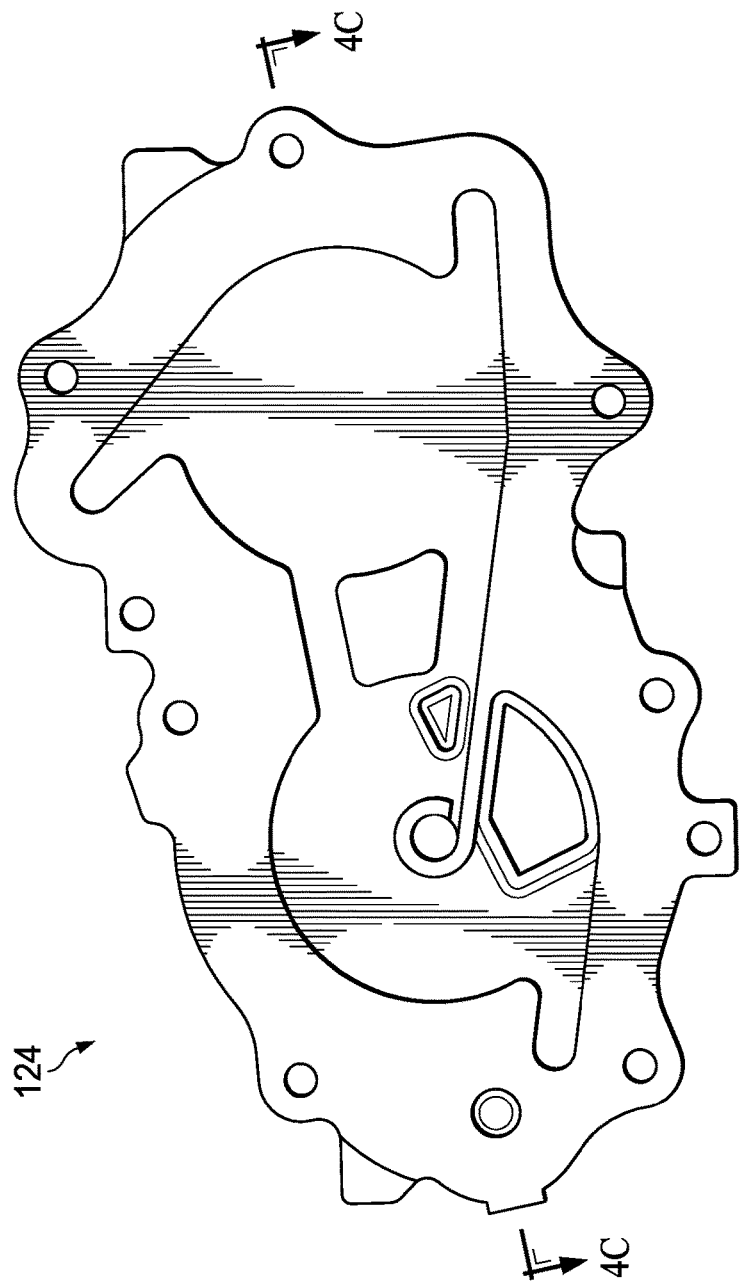
Figure 4C:
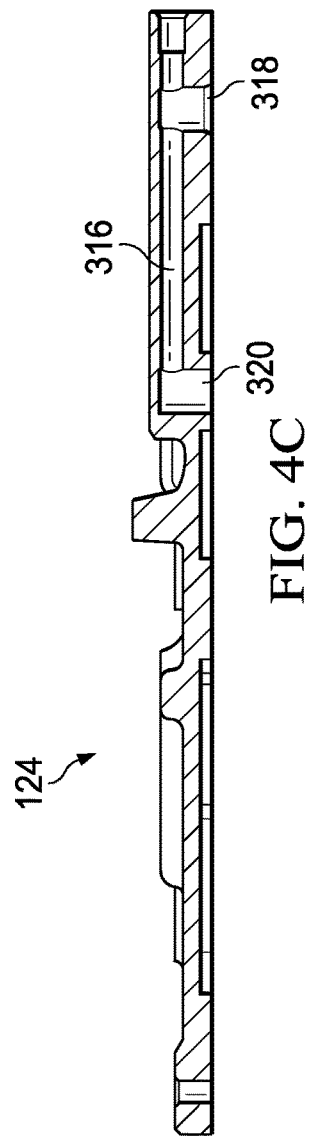
FIG. 4C illustrates a side sectional view along cutting line A-A of FIG. 4B, of a bearing shim plate according to disclosed embodiments.

FIGS. 4A and 4B illustrate inner side views, and FIG. 4C illustrates a side sectional view along cutting line A-A of FIG. 4B, of a bearing shim plate according to disclosed embodiments. Specifically, FIGS. 4A and 4B illustrate bearing shim plate 124 according to a first and second orientation respectively. For example, the different orientations could be for attaching to different gearboxes or different drive units. As will be explained, having reference to FIGS. 5A and 5B, the fluid passageways and outlets that are primarily relied upon differ in these different orientations. FIG. 4C illustrates a side sectional view of bearing shim plate 124 along sectional line A-A of FIG. 4B showing, amongst other things, fluid passageway 316 extending between bearing shim plate inlet 318 and first bearing shim plate outlet 320.

Figure 5A:
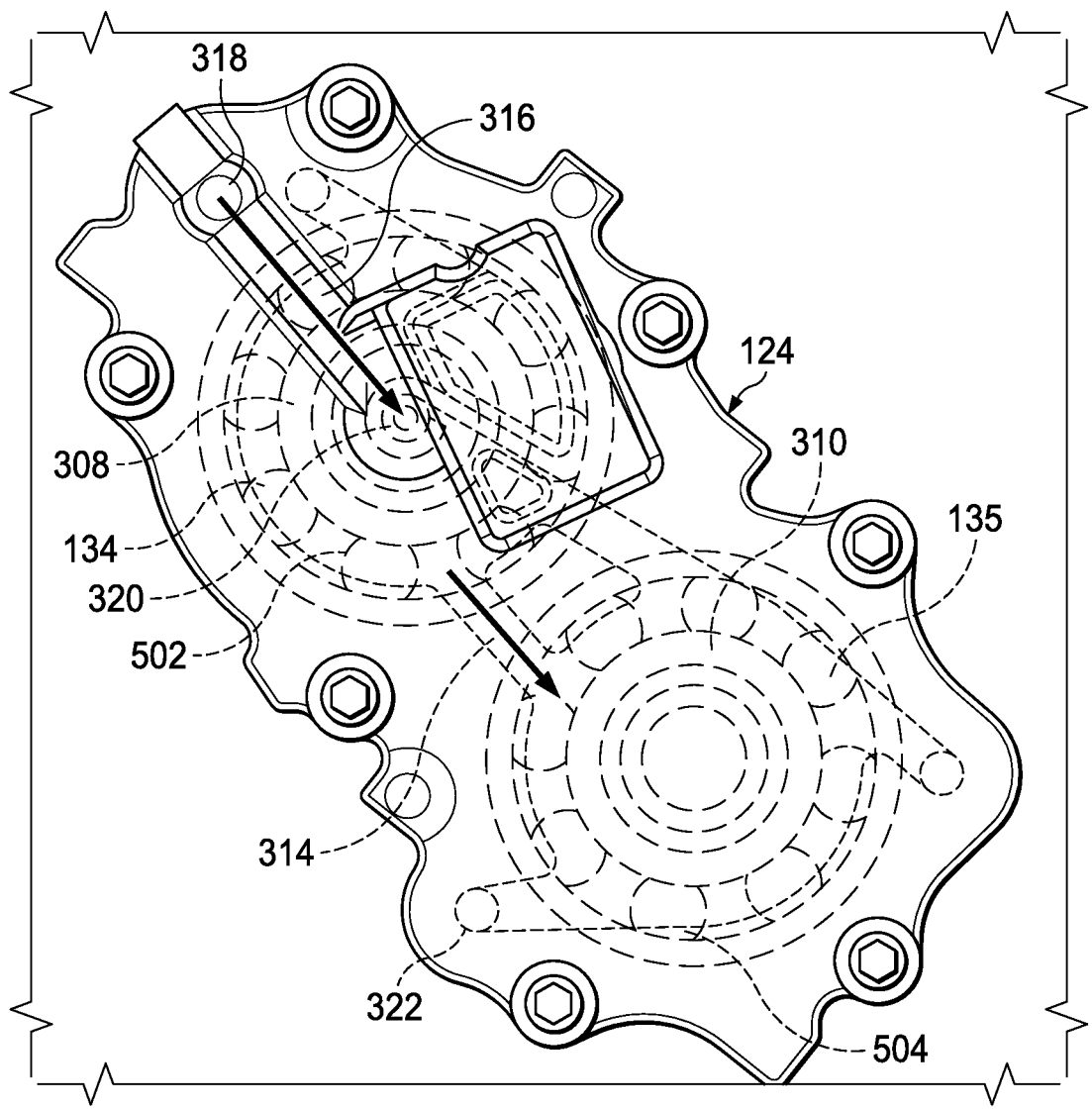
FIGS. 5A and 5B illustrate transparent outer side views of an installed bearing shim plate in first and second orientations, respectively, according to disclosed embodiments.
Figure 5B:
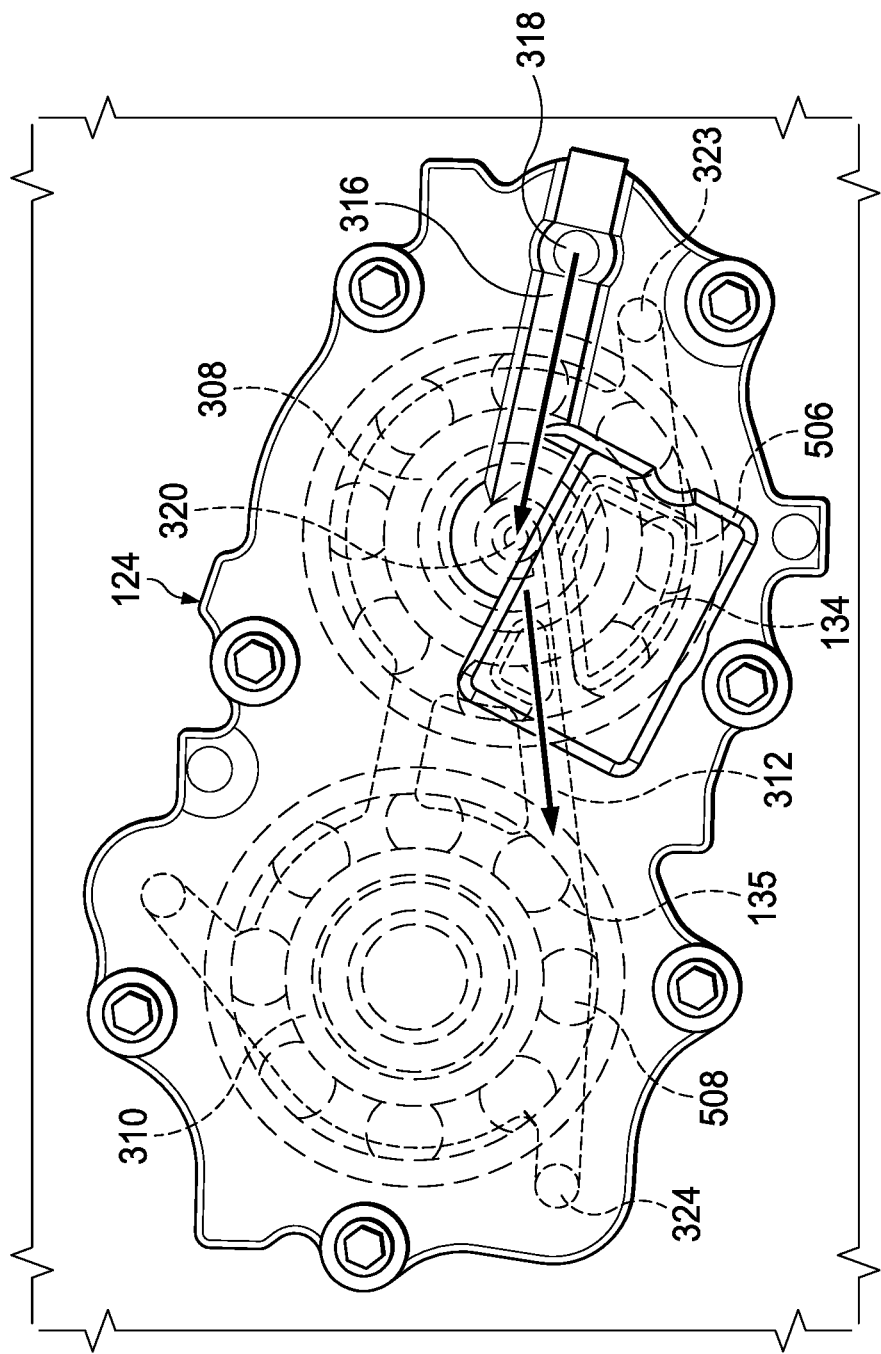

FIGS. 5A and 5B illustrate transparent outer side views of installed bearing shim plate 124 in first and second orientations respectively, according to disclosed embodiments. In FIGS. 5A and 5B longer dashed lines represent the bearings, shorter dashed lines show the cavity of the bearing shim plate, and solid arrows show the primary oil path through the bearing shim plate. As shown therein, oil flows from bearing shim plate inlet 318, through fluid passageway 316 to first bearing shim plate outlet 320 and into first chamber 308 to lubricate, amongst other things, input bearing 134 that is adjacent thereto. Specifically, oil is collected in first chamber 308 (and ultimately 310) via a controlled dynamic leak between first bearing shim plate outlet 320 and an oil tube (not shown), which arrangement will be explained in more detail in conjunction with FIGS. 6A, 6B, 7A, 7B, 8A and 8B.

In a first orientation shown in FIG. 5A, oil thereafter collects in bearing oil sump 502 and drains, primarily via fluid passageway 314, to second chamber 310 in order to lubricate intermediate bearing 135 which is adjacent thereto. Thereafter oil collects in bearing oil sump 504 and finally drains out of bearing shim plate 124 through second bearing shim plate outlet 322. In a second orientation shown in FIG.

5B, after exiting first bearing shim plate outlet 320 and entering first chamber 308, oil thereafter collects in bearing oil sump 506 and drains, primarily via fluid passageway 312 into second chamber 310 and thereafter collects in bearing oil sump 508 and ultimately drains out of bearing shim plate 124 though second bearing shim plate outlet 324. In the second orientation oil that collects in bearing oil sump 506 also drains out of bearing shim plate 124 via third bearing shim plate outlet 323.

Figure 6A:
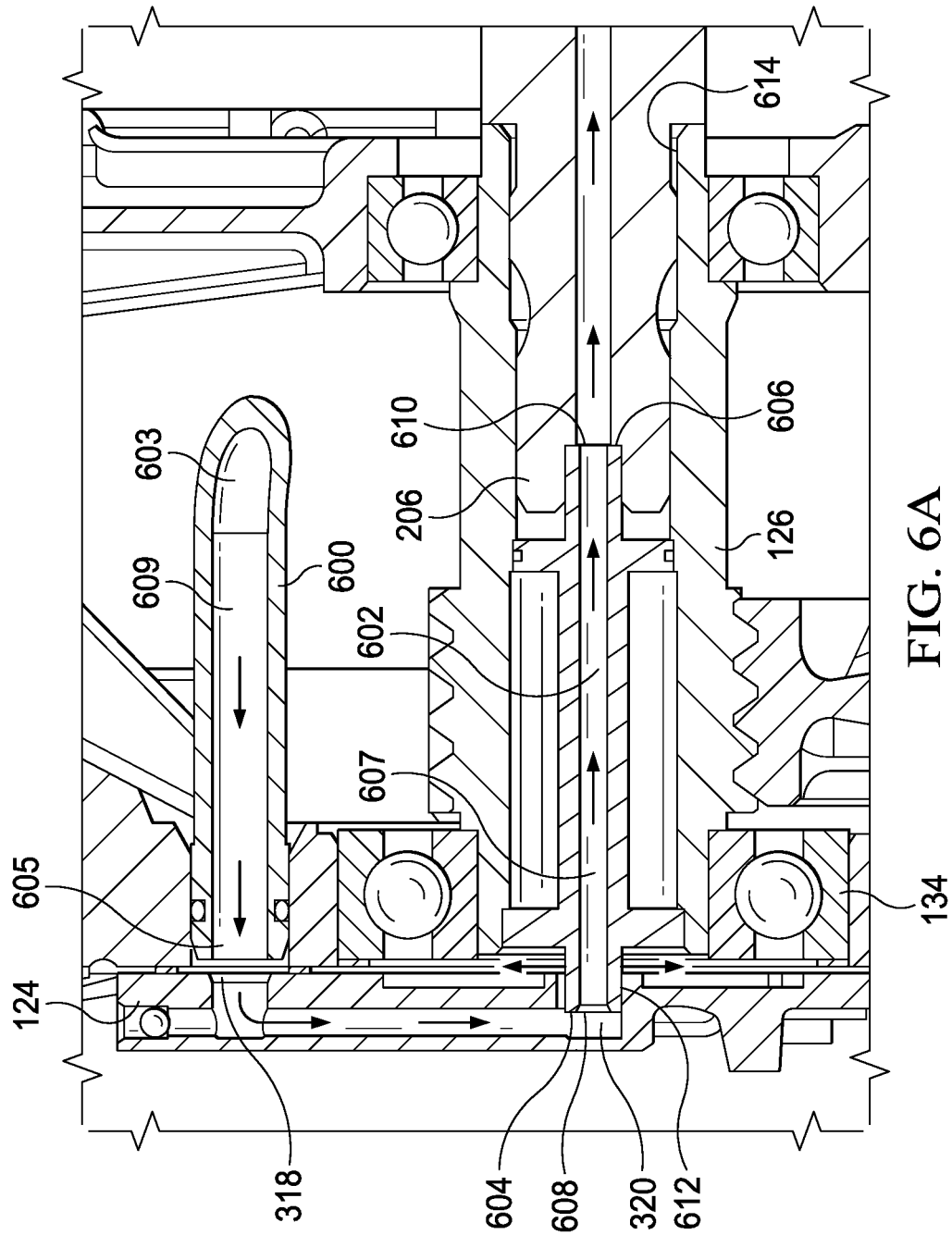
FIGS. 6A and 6B illustrate side sectional views of a drive unit in first and second orientations, respectively, according to disclosed embodiments, in particular showing tubes for transporting oil, a bearing shim plate, a gear shaft and a rotor shaft.
Figure 6B:
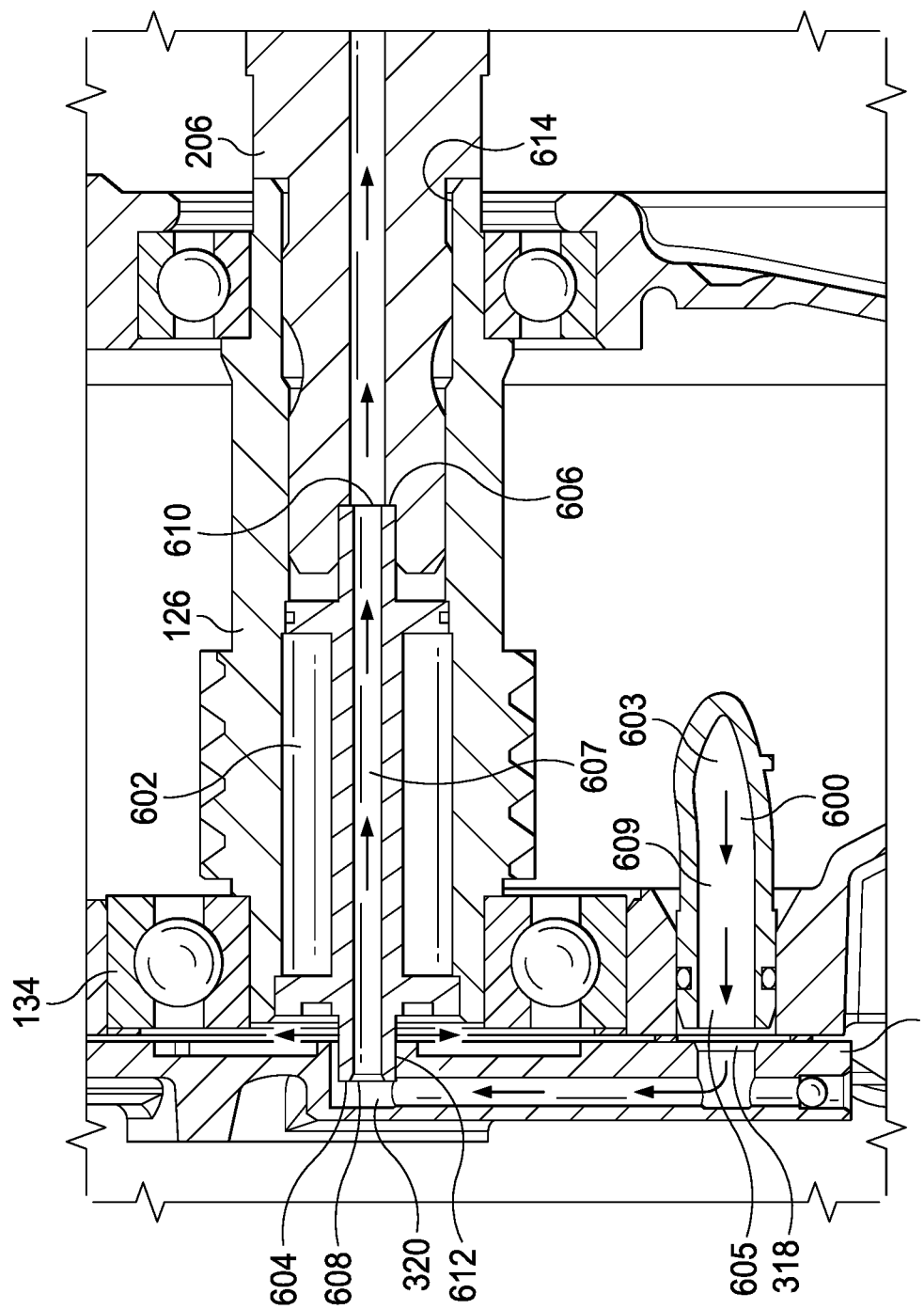

FIGS. 6A and 6B illustrate side sectional views of a drive unit in first and second orientations, respectively, according to disclosed embodiments. In particular, FIGS. 6A and 6B show tubes for transporting oil, a bearing shim plate, a gear shaft and a rotor shaft. More specifically, oil (represented by arrows) is shown flowing through inlet tube 600 (which can be made of plastic) to bearing shim plate 124, through bearing shim plate 124, from bearing shim plate inlet 318 to first bearing shim plate outlet 320, and to oil tube 602 situated within gear shaft 126. Oil tube 602 extends from bearing shim plate 124 to rotor shaft 206, defines end 604 and end 606, and further defines an oil tube passageway 607 from oil tube inlet 608 at end 604 to oil tube outlet 610 at end 606. Similarly, inlet tube 600 defines inlet tube inlet 603, inlet tube outlet 605 and inlet tube fluid passageway 609.

Oil tube inlet 608 is situated adjacent first bearing shim plate outlet 320 such that a radial gap 612 exists between oil tube 602 and bearing shim plate 124. During operation oil tube 602 rotates, while bearing shim plate 124 does not. The result, as noted above, is a controlled dynamic leak that allows oil to flow to bearing 134, and bearing 135 (not shown), via bearing shim plate 124. According to a disclosed embodiment, the oil is split such that a majority of the oil goes through oil tube 602, with only a smaller part leaking to bearings 134 and 135 via radial gap 612.

To control a desired flow split between oil tube 602, and that which flows to the bearings, the dimensions of radial gap 612 may be closely controlled. For if, on the one hand, radial gap 612 is too small, there will be insufficient bearing lubrication thereby reducing bearing life. Furthermore, a reduction in the flow of oil for motor cooling purposes will limit motor power capability. If, on the other hand, radial gap 612 is too big, the oil flow to the bearings will be too high and result in an increase in bearing drag loss which reduces the overall system efficiency. According to one disclosed embodiment, to ensure a desired amount of flow through radial gap 612, end 604 of oil tube 602 is machined concentric, and relative to, journal bore 614 of gear shaft 126.

The oil level within bearing shim plate 124 is also controlled by the tolerances and geometry of bearing shim plate 124 which is herein designed to minimize viscous drag losses while ensuring sufficient lubrication at all incline angles and all pump flow rates. Such an arrangement contributes to high durability by cooling/lubricating bearings, without sacrificing mechanical drag.

Though described in the context of operating in conjunction with bearing shim plate 124, one of skill in the art will appreciate that use of oil tube 602 is so not limited and could be used with other bearing shim plates or structures for delivering oil thereto, including those for use on drive units not having intermediate bearing 135. Similarly, bearing shim plate 124 need not be used in conjunction with oil tube 602, gear shaft 126 and/or rotor shaft 206 specifically (the details of which will be further explained below in conjunction with FIGS. 7A, 7B, 8A, 8B and 8C), but could be used with other systems employing different shafts.

FIGS. 7A and 7B show perspective views of a gear shaft and an oil tube in an unassembled form and an assembled form, respectively, according to disclosed embodiments. In particular, shown therein is oil tube 602 and gear shaft 126.

Figure 8A:
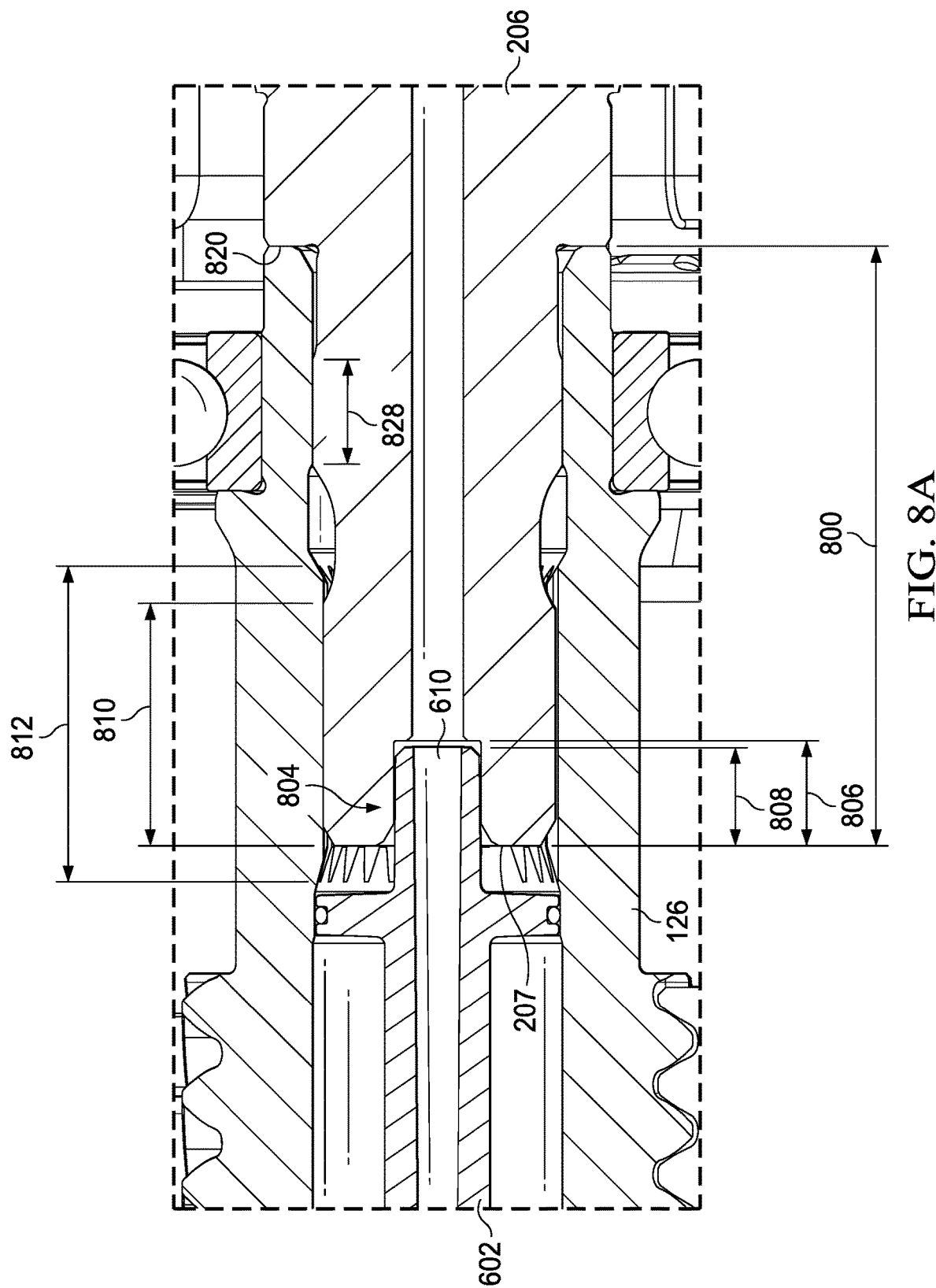
FIG. 8A shows a side sectional perspective view of a gear shaft and rotor shaft, and FIGS. 8B and 8C perspective views of a gear shaft and oil tube, and a rotor shaft, respectively, according to disclosed embodiments.
Figure 8B:
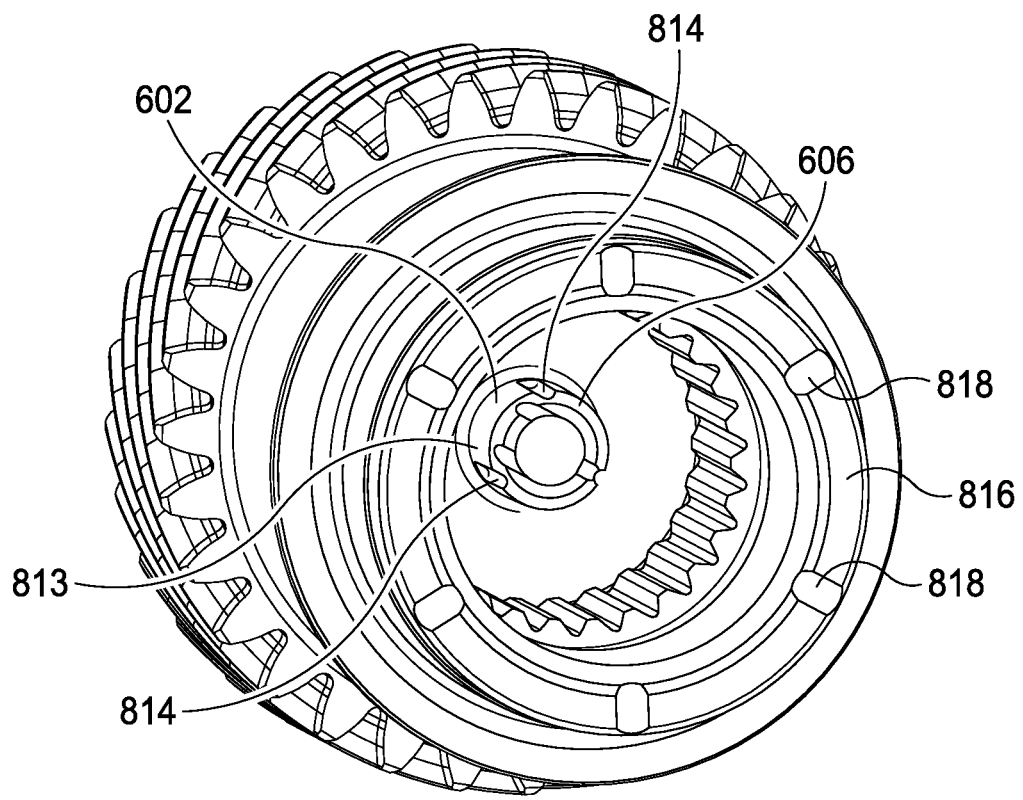
Figure 8C:
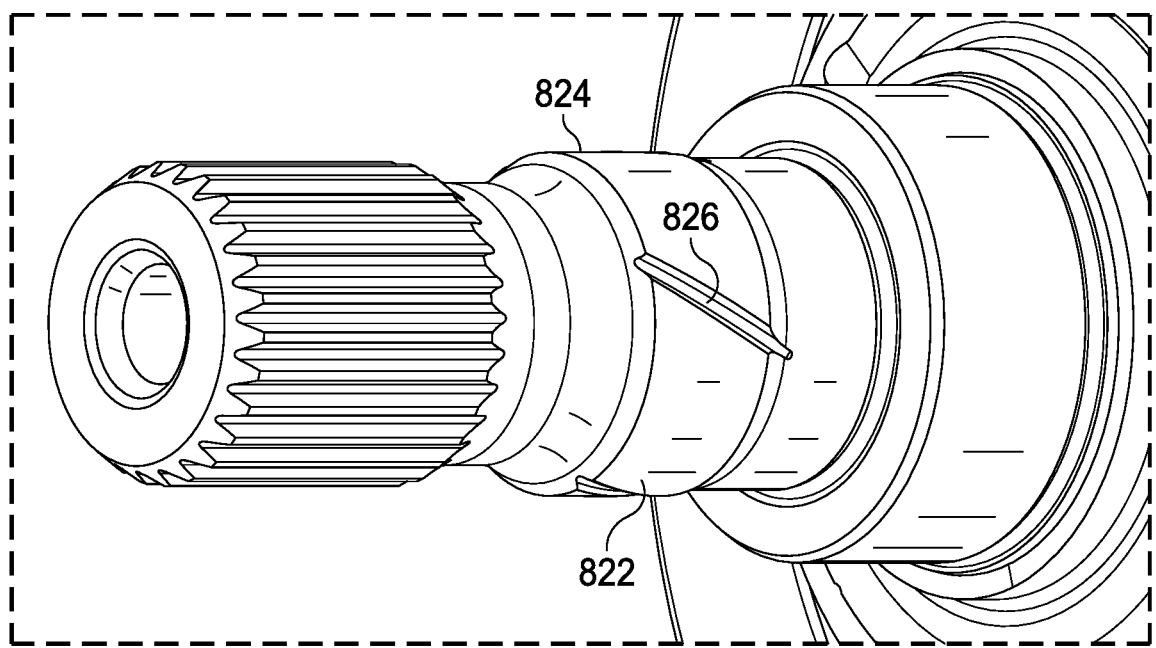

FIG. 8A shows a side sectional perspective view of a gear shaft and rotor shaft, and FIGS. 8B and 8C perspective views of a gear shaft and oil tube, and a rotor shaft, respectively, according to disclosed embodiments. Specifically, FIG. 8A shows oil tube 602 within gear shaft 126, and region 800 of rotor shaft 206 within gear shaft 126. Defined within end 207, of rotor shaft 206, is rotor shaft inlet 804. The rotor shaft 206 and inlet 804 further define an annular region 806. According to a described embodiment, inserted portion 808 of oil tube 602 is inserted into rotor shaft inlet 804 and positioned within annular region 806. Also shown in FIG. 8A is first spline connector 810 of rotor shaft 206, and second spline connector 812 of gear shaft 126, which together form a spline connection.

As shown in FIG. 8B, side surface 813 of oil tube 602 defines three channels therein, two of which are indicated with reference number 814, so as to allow oil to flow between inserted portion 808 of oil tube 602, and annular region 806 rotor shaft 206 (see FIG. 8A). Also shown in FIG. 8B is end 816 of gear shaft 126 defining six channels therein, two of which are indicated with reference number 818, which allow oil to flow between rotor shaft 206 and gear shaft 126 at shoulder 820 (see FIG. 8A). As will be appreciated by one of skill in the art, channels 818 provide an oil leak path into the gearbox cavity which may normalize the pressure therein.

As shown in FIG. 8C, pilot journal 822 of rotor shaft 206, more generally side surface 824 of rotor shaft 206, defines four channels, one of which is labelled 826. Channels 826 allow oil to flow, and thereby provide a lubrication leak path, between gear shaft 126 and rotor shaft 206, in journal region 828 (see FIG. 8A).

According to the described arrangement of FIGS. 8A-8C, the flow of oil is split between flowing through the rotor shaft, and through various interfaces between rotor shaft 206 and gear shaft 126 so that oil can flow to other parts of the electric drive unit.

For purposes of this specification, end 207 of rotor shaft 206 may also be referred to as first end 207. End 208 of rotor shaft 206 may also be referred to as second end 208. Region 800 of rotor shaft 206 may also be referred to as first region 800. Shoulder 820 of rotor shaft 206 may also be referred to as first shoulder 820. End 209 of gear shaft 126 may also be referred to as third end 209. End 210 of gear shaft 126 may also be referred to as fourth end 210. Oil tube 602 may also be referred to as $1^{st}$ tube 602. Oil tube end 604 may also be referred to as fifth end 604. Oil tube end 606 may also be referred to as sixth end 606. Oil tube inlet 608 may also be referred to as first tube inlet 608. Oil tube outlet 610 may also be referred to as first tube outlet 610. Oil tube fluid passageway 607 may also be referred to as first fluid passageway 607. Inlet tube 600 may also be referred to as second tube 600. Inlet tube inlet 603 may also be referred to as second tube inlet 603. Inlet tube outlet 605 may also be referred to as second tube outlet 605. Inlet tube fluid passageway 609 may also be referred to as second fluid passageway 609. Bearing shim plate fluid passageway 312 may also be referred to as third fluid passageway 312. Bearing shim plate fluid passageway 316 may also be referred to as fourth fluid passageway 316. Bearing shim plate fluid passageway 314 may also be referred to as fifth fluid passageway 314.

Figure 9:
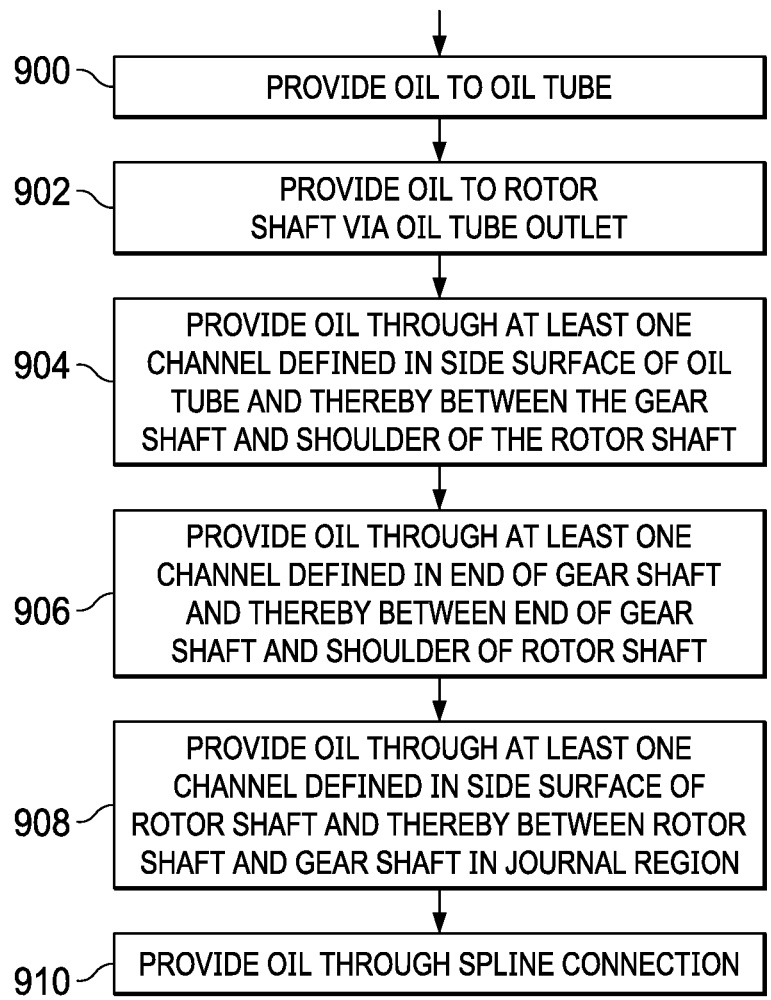
FIG. 9 shows a method of providing cooling and lubrication in a power transmission system according to a disclosed embodiment.

FIG. 9 shows a method of providing cooling and lubrication in a power transmission system according to a disclosed embodiment, which method can use the structure and apparatus disclosed above with respect to FIGS. 1-9. Specifically, a first step 900 is to provide oil to the oil tube. A second step 902 is to provide oil to rotor shaft via the oil tube outlet of the oil tube. An optional third step 904 is to provide oil through the at least one channel defined in the side surface of the oil tube, and thereby between the inserted portion of the oil tube and the annular region of the rotor shaft. An optional fourth step 906 is to provide oil through the at least one channel defined in the end of the gear shaft, and thereby between the gear shaft and the shoulder of the rotor shaft. An optional fifth step 908 is to provide oil through at least one channel defined in a side surface of the rotor shaft in a journal region, and thereby between the rotor shaft and the gear shaft. An optional sixth step 910 is to provide oil through the spline connection.

Figure 10:
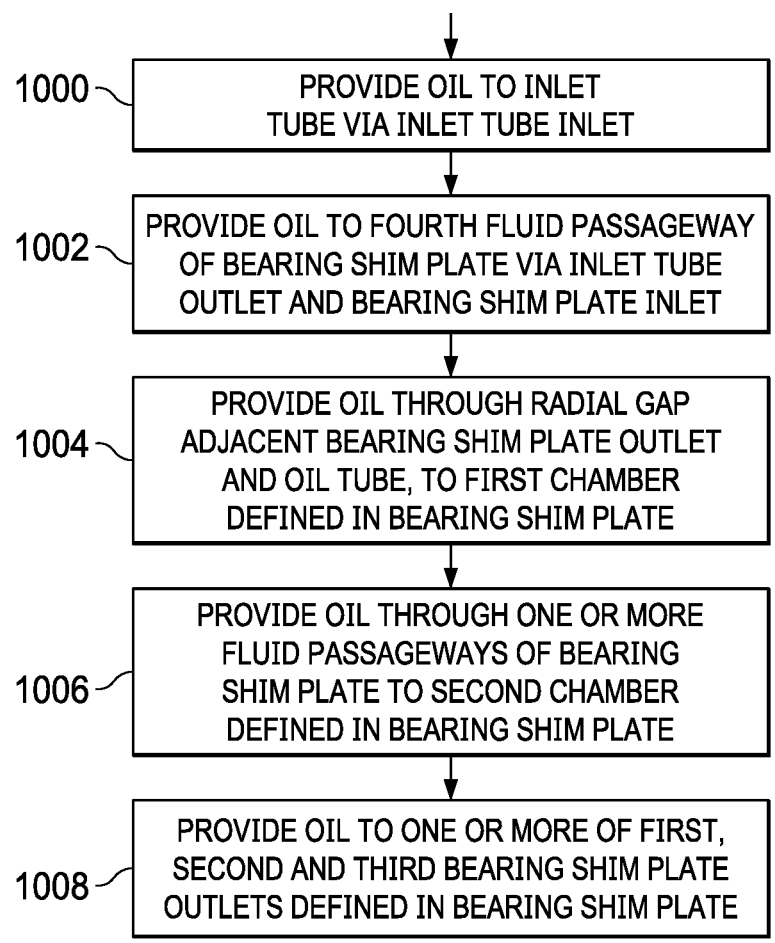
FIG. 10 shows a method of providing cooling and lubrication in a power transmission system according to another disclosed embodiment.

FIG. 10 shows a method of providing cooling and lubrication in a power transmission system according to another disclosed embodiment. Specifically, a first step 1000 is to provide oil to the inlet tube via the inlet tube inlet. A second step 1002, is to provide oil to the fourth fluid passageway of the bearing shim plate, via the inlet tube outlet and bearing shim plate inlet. A third step 1004 is to provide oil through the radial gap adjacent the first bearing shim plate outlet and the oil tube, to the first chamber defined in bearing shim plate. A fourth step 1006 is to provide oil through one or more of the third and fifth fluid passageways of the bearing shim plate to the second chamber defined therein. A fifth step 1008 is to provide oil to one or more of the first, second and third bearing shim plate outlets defined in the bearing shim plate.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. An electric drive unit comprising: a rotor shaft having a first end, a second end, a first region extending from the first end to a first shoulder, and a rotor shaft inlet within the first end; a gear shaft having a third end, a fourth end, wherein the first region of the rotor shaft resides within the fourth end of the gear shaft, and the fourth end is adjacent the first shoulder; and an a cylindrical oil tube residing directly within the gear shaft at the third end, having an oil tube inlet at a fifth end, an oil tube outlet at a sixth end adjacent the rotor shaft inlet, and an oil tube passageway extending between the oil tube inlet and the oil tube outlet, wherein the oil tube inlet extends beyond the third end of the gear shaft and the oil tube outlet is located at the sixth end of the oil tube and within the fourth end of the gear shaft.

2. The electric drive unit of claim 1, wherein the third end has at least one channel defined therein.

3. The electric drive unit of claim 1, wherein the rotor shaft defines a first spline connector within the first region, wherein the gear shaft defines a second spline connector, and wherein the first spline connector and second spline connector form a spline connection.

4. The electric drive unit of claim 1, wherein at least one channel is defined in a first side surface of the rotor shaft within the first region.

5. The electric drive unit of claim 4, wherein the at least one channel is defined in a pilot journal of the rotor shaft.

6. The electric drive unit of claim 1, further comprising a bearing shim plate having a bearing shim plate outlet defined therein, wherein the oil tube inlet is adjacent to the bearing shim plate outlet with a gap existing therebetween.

7. The electric drive unit of claim 6, wherein the oil tube inlet is machined.

8. The electric drive unit of claim 6, wherein the oil tube inlet of the oil tube is adjacent to the bearing shim plate outlet with the gap existing therebetween.

9. The electric drive unit of claim 6, wherein the bearing shim plate covers a first bearing and a second bearing.

10. A method for use in an electric drive unit, the method comprising:
providing the electric drive unit of claim 1;
providing oil into the oil tube via the oil tube inlet; and
providing the oil to the rotor shaft inlet via the oil tube outlet.

11. The method of claim 10, for use in the electric drive unit wherein an annular region is defined in the first region extending from the first end to the rotor shaft inlet, wherein an inserted portion of the oil tube is positioned within the annular region, wherein the oil tube outlet is adjacent to the rotor shaft inlet, and wherein the sixth end has at least one channel defined therein, the method further comprising, providing the oil through the at least one channel and between the inserted portion of the oil tube and the annular region.

12. The method of claim 10, for use in the electric drive unit wherein the third end has at least one channel defined therein, the method further comprising, providing the oil through the at least one channel and between the third end and the first shoulder.

13. The method of claim 10, for use in the electric drive unit wherein at least one channel is defined in a first side surface of the rotor shaft within the first region, the method comprising, providing the oil through the at least one channel and between the first region of the rotor shaft and the gear shaft.

14. The method of claim 10, for use in the electric drive unit wherein the rotor shaft defines a first spline connector within the first region, wherein the gear shaft defines a second spline connector, and wherein the first spline connector and the second spline connector form a spline connection, the method further comprising, providing oil through the spline connection.

15. The electric drive unit of claim 1, wherein an annular region is defined in the first region extending from the first end to the rotor shaft inlet.

16. The electric drive unit of claim 15, wherein an inserted portion of the oil tube is positioned within the annular region, and wherein the oil tube outlet is adjacent to the rotor shaft inlet.

17. The electric drive unit of claim 16, wherein the sixth end has at least one channel defined therein.

18. An electric drive unit comprising: a rotor shaft having a first end, a second end, and a rotor shaft inlet defined in the first end of the rotor shaft; a gear shaft having a third end and a fourth end; a first tube having a fifth end and a sixth end and defining a first fluid passageway from a first tube inlet defined in the fifth end to a first tube outlet defined in the sixth end; a second tube defining a second fluid passageway from a second tube inlet to a second tube outlet; a first bearing; a second bearing; and a bearing shim plate having a body, the body defining an outer side and an inner side, the body further defining a fourth fluid passageway extending from a bearing shim plate inlet defined in the inner side of the body to a first bearing shim plate outlet defined in the inner side of the body, the body further defining a cavity extending into the body from the inner side of the body toward the outer side of the body, the cavity defining: a first chamber having the first bearing shim plate outlet situated therein; a second chamber; a third fluid passageway extending between the first chamber and second chamber; and a second bearing shim plate outlet in fluid communication with the second chamber, wherein the first tube is situated within the gear shaft with the first tube outlet adjacent the rotor shaft inlet; wherein the second tube outlet is connected to and in fluid communication with the bearing shim plate inlet; wherein the first tube inlet is adjacent to and in fluid communication with the first bearing shim plate outlet with a gap existing therebetween; wherein the first chamber is adjacent the first bearing; and wherein the second chamber is adjacent the second bearing.

19. The electric drive unit of claim 18, wherein the body further defines a fifth fluid passageway extending between the first chamber and the second chamber.

20. The electric drive unit of claim 18, wherein the body further defines a third bearing shim plate outlet in fluid communication with the first chamber.

* * * * *